(12) United States Patent
Pötsch et al.

(10) Patent No.: US 11,147,657 B2
(45) Date of Patent: Oct. 19, 2021

(54) INTERDENTAL CLEANER

(71) Applicant: SUNSTAR SUISSE S.A., Etoy (CH)

(72) Inventors: Gerhard Pötsch, Freibrug (DE);
Christian Leisinger, Schopfheim (DE);
Jürgen Butz, Schönau (DE)

(73) Assignee: SUNSTAR SUISSE S.A., Etoy (CH)

( * ) Notice: Subject to any disclaimer, the term of this patent is extended or adjusted under 35 U.S.C. 154(b) by 308 days.

(21) Appl. No.: 16/311,403

(22) PCT Filed: Jun. 21, 2017

(86) PCT No.: PCT/EP2017/000719
§ 371 (c)(1),
(2) Date: Dec. 19, 2018

(87) PCT Pub. No.: WO2017/220200
PCT Pub. Date: Dec. 28, 2017

(65) Prior Publication Data
US 2019/0183617 A1    Jun. 20, 2019

(30) Foreign Application Priority Data

Jun. 23, 2016 (DE) ...................... 10 2016 007 658.5

(51) Int. Cl.
*A61C 15/00* (2006.01)
*A61C 15/02* (2006.01)
*A46B 9/06* (2006.01)
*A46B 9/04* (2006.01)

(52) U.S. Cl.
CPC ............... *A61C 15/02* (2013.01); *A46B 9/06* (2013.01); *A46B 9/04* (2013.01); *A46B 2200/108* (2013.01)

(58) Field of Classification Search
CPC .. A61C 15/02; A46B 9/06; A46B 9/04; A46B 2200/108
See application file for complete search history.

(56) References Cited

U.S. PATENT DOCUMENTS

| 4,922,936 A | 5/1990 | Buzzi et al. | |
| 5,693,360 A * | 12/1997 | Stern | A61C 15/02 132/321 |
| 5,775,346 A * | 7/1998 | Szyszkowski | A61C 15/00 132/321 |
| 5,944,519 A * | 8/1999 | Griffiths | A46B 7/04 132/329 |
| 6,082,999 A * | 7/2000 | Tcherny | A46B 9/04 132/308 |
| 7,264,005 B2 * | 9/2007 | Wong | A61C 15/02 132/321 |

(Continued)

FOREIGN PATENT DOCUMENTS

| CN | 2 710 571 Y | 7/2005 |
| DE | 203 09 295 U1 | 10/2003 |

(Continued)

*Primary Examiner* — Nicholas D Lucchesi
(74) *Attorney, Agent, or Firm* — McGlew and Tuttle, P.C.

(57) ABSTRACT

An interdental cleaner has a rod-shaped support which is made of plastic and which, at a support rear end region, has a grip part. A support opposite front end region has a flocking with flock fibers made of plastic. The rod-shaped support is provided, in the support front end region, with a sleeve-shaped cover made of a flexible plastic. The flocking is arranged on the cover.

20 Claims, 2 Drawing Sheets

(56) References Cited

U.S. PATENT DOCUMENTS

| | | | | |
|---|---|---|---|---|
| 7,882,588 B2* | 2/2011 | Dragan | ............... | A46B 5/0016 |
| | | | | 15/106 |
| 8,114,027 B2* | 2/2012 | Triva | ..................... | A61F 13/38 |
| | | | | 600/573 |
| 9,170,177 B2* | 10/2015 | Triva | ..................... | A61B 10/02 |
| 10,195,005 B2* | 2/2019 | Wallstrom | ............ | A61C 15/02 |
| 2008/0060669 A1* | 3/2008 | Malvar | ............... | A45D 40/262 |
| | | | | 132/218 |
| 2015/0282601 A1* | 10/2015 | Butz | ..................... | A61C 15/00 |
| | | | | 15/167.1 |

FOREIGN PATENT DOCUMENTS

| | | |
|---|---|---|
| DE | 10 2011 101 391 A1 | 11/2012 |
| DE | 10 2013 010782 A1 | 12/2014 |
| EP | 0 277 156 B1 | 8/1991 |
| EP | 0 707 836 A2 | 4/1996 |
| EP | 0 932 371 B1 | 12/2001 |
| JP | 2003 245287 A | 9/2003 |

* cited by examiner

INTERDENTAL CLEANER

CROSS REFERENCE TO RELATED APPLICATIONS

This application is a United States National Phase Application of International Application PCT/EP2017/000719 filed Jun. 21, 2017, and claims the benefit of priority under 35 U.S.C. § 119 of German Application 10 2016 007 658.5, filed Jun. 23, 2016, the entire contents of which are incorporated herein by reference.

TECHNICAL FIELD

The invention relates to an interdental cleaner with a rod-shaped support which is made of plastic and which, in its rear end region, has a grip part and, in its opposite front end region, has a flocking with flock fibers made of plastic.

BACKGROUND

Interdental cleaners have already been known for some time in the form of rod-shaped toothpicks, which were earlier produced from wood and then later from plastic. In order to enhance the cleaning action of a corresponding interdental cleaner, it is known, for example from U.S. Pat. No. 4,922,936 A or from DE 203 09 295 U1, to provide the rod-shaped support of the interdental cleaner with a flocking of flock fibers.

The flock fibers have to be fastened very firmly to the rod-shaped support, since it is very unpleasant for a user if the fibers come loose from the support during use. However, the rod-shaped support mainly has to ensure the stability and elasticity of the interdental cleaner, and therefore the plastic material of the rod-shaped support has to be chosen not in terms of providing the best possible connection to the flock fibers but solely in respect of stability and elasticity. It has been found that the plastic materials that provide sufficient stability and elasticity of the support, and therefore of the interdental cleaner, do not permit reliable fixing of the flock fibers.

SUMMARY OF THE INVENTION

An object of the invention is to make available an interdental cleaner which is of the type in question and which, on the one hand, has sufficient stability and elasticity and, on the other hand, allows the flock fibers to be held securely.

According to the invention, provision is made that a rod-shaped support is provided, with a front end region, with a sleeve-shaped cover made of a flexible plastic, and flocking arranged on the cover.

The invention starts out from the principle that the flocking is not arranged directly on the support, and instead a cover made of a flexible plastic is interposed between them. This has the advantage that the plastic material of the support can be chosen solely in respect of the stability and elasticity of the support, since the flocking is not in contact with the support. A further function of the cover is that the support, which is preferably made of a dimensionally stable, relatively hard plastic, is encased by the cover, at least in its front end region with which it is inserted into the interdental space, and the risk of injury to the user is thereby reduced. The plastic material of the cover does not have to be chosen with regard to the stability of the interdental cleaner, and instead it can be chosen and optimized to provide good fixing of the flock fibers. It is in this way possible to achieve a complete separation between the demands regarding, on the one hand, the stability and elasticity and, on the other hand, the fixing of the flock fibers.

It has proven advantageous if the support is made of a dimensionally stable plastic, in particular of polypropylene or polyamide. Alternatively, the support can also be made of polybutylene terephthalate, polyester, polyethylene or also an impact-modified plastic such as polycarbonate or polystyrene. The plastic material of the support can be reinforced with fibers, for which purpose it is possible, for example, to use glass fibers and/or natural fibers and/or carbon fibers.

The cover can be made completely or at least predominantly of a thermoplastic elastomer, of a thermoplastic polyurethane or of silicone. If appropriate, a further plastic can be added thereto proportionately, in particular polypropylene.

In a preferred embodiment, the flocking comprises an adhesive layer on which the flock fibers are held. The flock fibers or the flocking material can be made, for example, of polyamide, polypropylene, viscose, acryl, polyester, or also cotton fibers or polybutylene terephthalate.

The length of the flock fibers preferably lies in a range of 0.2 mm to 2.0 mm, and in particular in a range between 1.0 mm and 1.5 mm.

The flock fibers have a fineness which, measured in tex (1 tex=1 g per 1000 m length), is preferably in the range of 0.09 tex to 2.2 tex, and preferably in the range of 0.17 tex to 0.67 tex.

The flock fibers can be of any desired colors or can even have an undefined color mix.

In one possible embodiment of the invention, provision can be made that the cover is covered completely by the flocking.

Alternatively, provision can be made that the cover is covered by the flocking only in its front end region. The front end region of the cover, covered by the flocking, preferably comprises a third to a half of the axial length of the cover.

In a preferred embodiment of the invention, provision is made that the outside of the cover has a plurality of integrally formed fingers protruding radially outward, which fingers are preferably made of the same flexible material as the cover. Compared to the flocking, the fingers provide a rougher structuring and are used for preliminary cleaning of the interdental space, whereas the flocking serves for deep cleaning of the interdental space. In this way, different cleaning functions are achieved on one interdental cleaner.

In one possible embodiment of the invention, provision is made that the cover is provided with the flocking only in its region between its front end and the fingers, i.e. the region of the cover in which the fingers are arranged is free of the flocking and, in particular, no flocking is provided between the fingers. This creates a functional separation between the preliminary cleaning by means of the fingers and the deep cleaning by means of the flocking, since the region of the cover lying between the fingers is free of the flocking.

Alternatively, provision can be made that the flocking is arranged also or only in the region of the cover lying between the fingers. This embodiment has the effect that, upon insertion of the interdental cleaner into the interdental space, cleaning by means of the fingers and cleaning by means of the flocking take place simultaneously.

The support can have a circular, polygonal or oval cross section. In order to reach regions of the interdental space that are difficult to access, it has proven advantageous to adapt the geometry of the cross section to the appearance of the interdental space, which has a triangular shape. For this purpose, provision can be made that the support has a triangular cross section.

The outer contour of the cover preferably follows the outer contour of the support, i.e. the cover sits with a constant layer thickness on the support. Alternatively, however, it is also possible that the outer contour of the cover deviates from the cross-sectional shape of the support, such that the cover encloses the support with a layer thickness that differs in regions.

In a particularly preferred embodiment of the invention, provision is made that the cover has a triangular outer contour and the support has a circular, polygonal or oval cross section, such that tapering corner regions of the triangular outer contour of the cover are formed. This has the advantage that the corner regions of the cover made of flexible plastic are very pliable and can easily conform to the interdental space when the interdental cleaner is inserted into the interdental space. The corner regions of the triangular outer contour of the cover can in this way come close to the tooth surfaces, and the flock fibers held on the cover can easily penetrate this region. In addition, the flock fibers can also penetrate the gingival margin and efficiently clean these regions.

Further details and features of the invention will become clear from the following description of illustrative embodiments and by reference to the drawings. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

DESCRIPTION OF PREFERRED EMBODIMENTS

Figure 1:
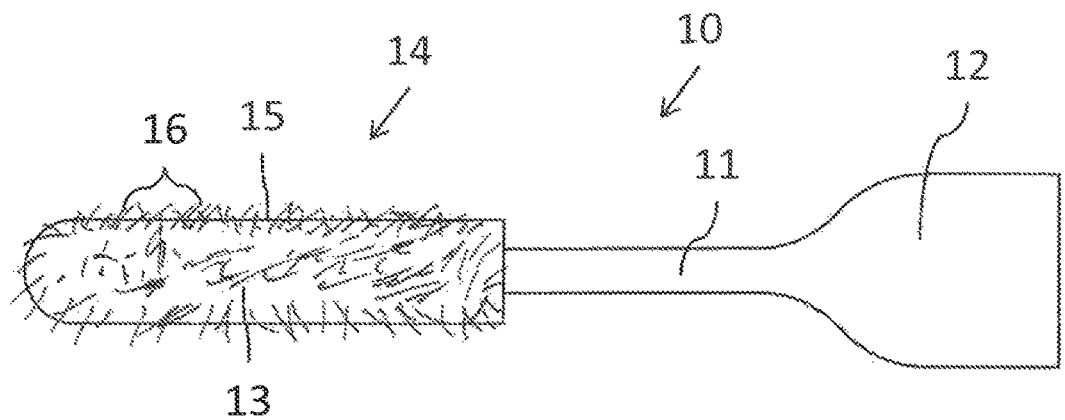
FIG. 1 is a schematic side view of an interdental cleaner in a first illustrative embodiment.

Referring to the drawings, an interdental cleaner 10 shown in FIG. 1 has an elongate rod-shaped support 11 which is made of a dimensionally stable plastic and which, at its rear end (the right-hand end in FIG. 1), is provided with a grip part 12 at which a user can take hold of the interdental cleaner 10.

At an opposite front end (the left-hand end in FIG. 1), the rod-shaped support 11 is provided with a sleeve-shaped cover 13 made of a flexible plastic. The cover 13 completely covers approximately ⅓ of the axial length of the interdental cleaner 10. A flocking 14 is arranged on the outer face of the cover 13 directed away from the rod-shaped support 11. The flocking 14 comprises an adhesive layer 15 in which short flock fibers 16 made of plastic are held.

As FIG. 1 shows, the outer face of the cover 13 in this illustrative embodiment is covered completely by the flocking 14.

Figure 2:
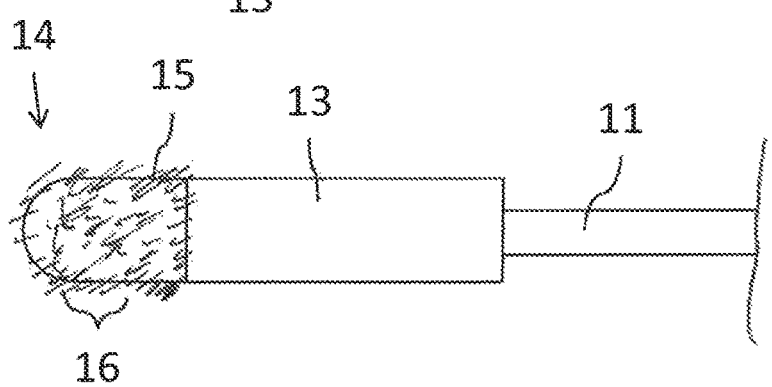
FIG. 2 is a schematic side view of an interdental cleaner in a second illustrative embodiment.

FIG. 2 shows a modification of the interdental cleaner 10 according to FIG. 1 and differs from the latter in that the cover 13 is provided with the flocking 14 only in its front end region, which comprises approximately one third to a half of the axial length of the cover 13, while the cover 13 in its other regions is free of the flocking.

Figure 3:
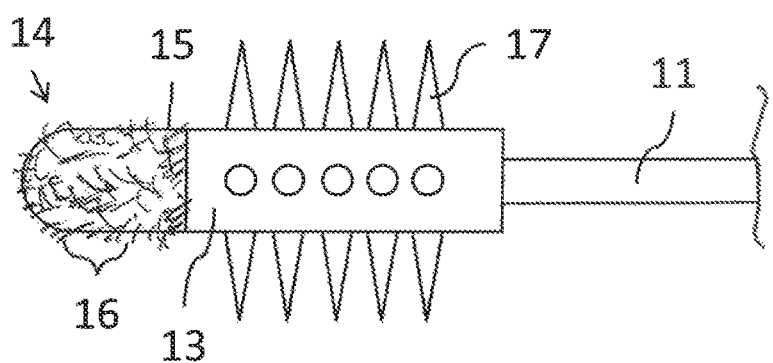
FIG. 3 is a schematic side view of an interdental cleaner in a third illustrative embodiment.

FIG. 3 shows a development of the interdental cleaner 10 according to FIG. 2 and differs from the latter only in that a plurality of integrally formed, radially outwardly protruding fingers 17, which are made of the same flexible material as the cover 13, are provided externally in the region of the cover 13 which is set back from the front end (the left-hand end in FIG. 3) and in which no flocking is provided. This means that the flocking 14 is formed in the front region of the cover 13 and the fingers 17 are formed in the rear or remaining region of the cover 13. The portions of the cover 13 lying between the fingers 17 are free of the flocking here.

Figure 4:
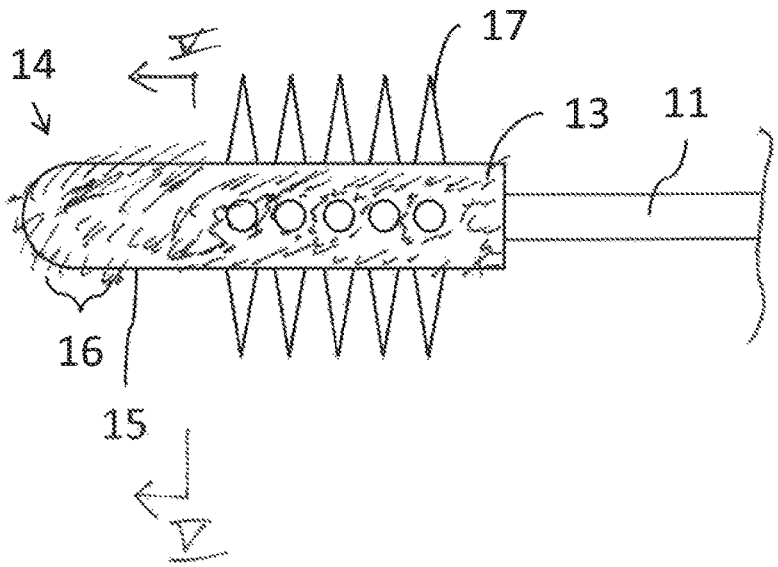
FIG. 4 is a schematic side view of an interdental cleaner in a fourth illustrative embodiment.

FIG. 4 shows a development of the interdental cleaner 10 according to FIG. 3 and differs from the latter in that the regions of the cover 13 arranged between the fingers 17 are now also provided with the flocking 14.

Figure 5:
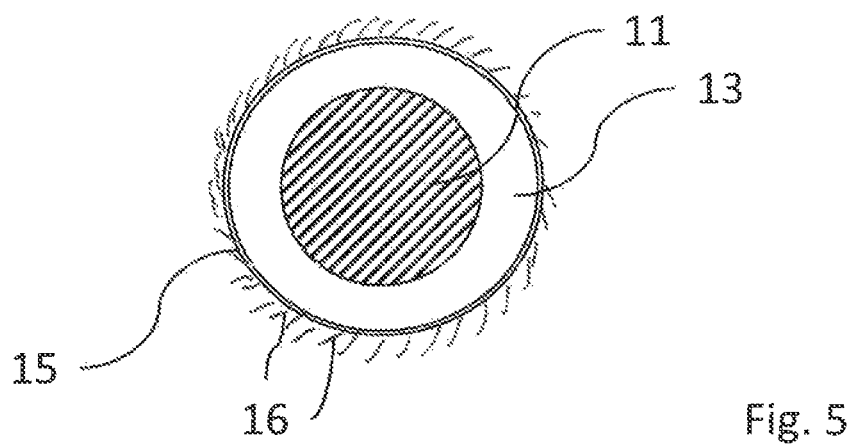
FIG. 5 is the cross section V-V in FIG. 4.

As FIG. 5 shows, the support 11 has a circular cross section and is surrounded by the cover 13 with an approximately constant layer thickness, i.e. the cover 13 has a circular outer contour and thus follows the outer contour of the support 11. Arranged on the outer face of the cover 13 is the adhesive layer 15 in which the flock fibers 16 are held.

Figure 6:
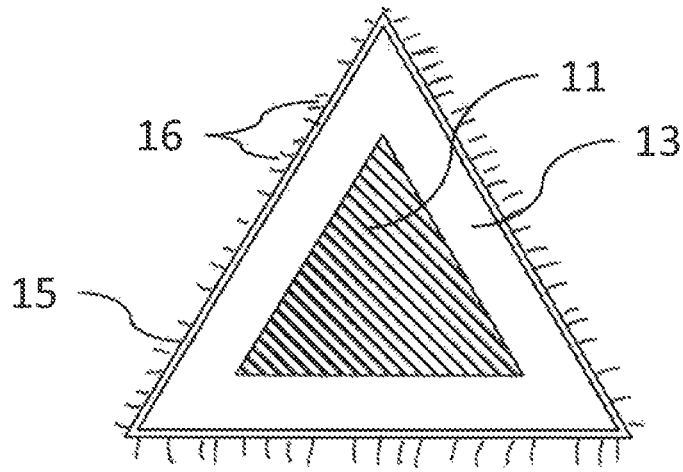
FIG. 6 is the cross section according to FIG. 5 in a first alternative configuration.

In a modification of the embodiment according to FIG. 5, FIG. 6 shows an embodiment in which the rod-shaped support 11 has a triangular cross section and is covered by the cover 13 in a constant layer thickness, i.e. here too the outer contour of the cover 13 follows the outer contour of the support 11. Arranged again on the outer face of the cover 13 is the adhesive layer 15 in which the flock fibers 16 are held.

Figure 7:
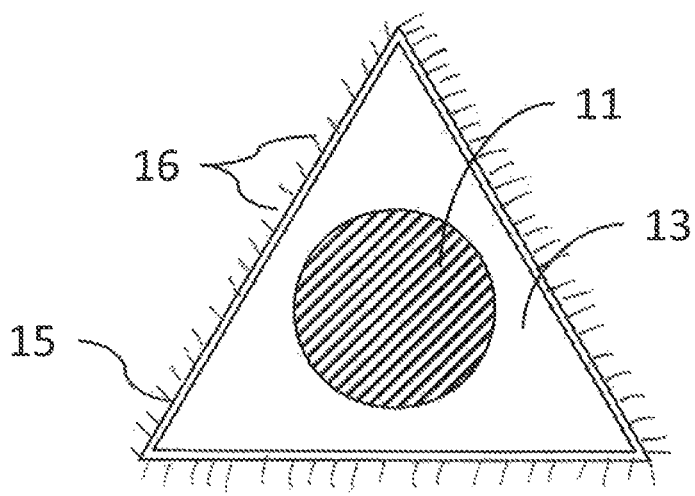
FIG. 7 is the cross section according to FIG. 5 in a second alternative configuration.

In the embodiment according to FIG. 7, the support 11 has a circular cross section, while the cover 13, which encloses the support 11, has a triangular cross section. This has the effect that only the relatively soft material of the cover 13 is present in the corner regions of the triangular cover 13, such that the corner regions are particularly pliable and can adapt well to the shape of the interdental spaces. Arranged again on the outer face of the cover 13 is the adhesive layer 15 in which the flock fibers 16 are held.

While specific embodiments of the invention have been shown and described in detail to illustrate the application of the principles of the invention, it will be understood that the invention may be embodied otherwise without departing from such principles.

The invention claimed is:

1. An interdental cleaner comprising:
   a rod-shaped support comprised of plastic with a rear end region having a grip part and an opposite front end region;
   a sleeve cover; and
   a flocking with flock fibers made of plastic, wherein the rod-shaped support is provided, in the front end region, with the sleeve cover made of a flexible plastic, and the flocking is arranged on the cover, wherein the outside of the cover has a plurality of integrally formed fingers protruding radially outward, the fingers being made of the same flexible material as the cover, wherein the sleeve cover is provided with the flocking in a cover region between a cover front end and the fingers.

2. The interdental cleaner as claimed in claim 1, wherein the cover is covered completely by the flocking.

3. The interdental cleaner as claimed in claim 1, wherein the cover is covered by the flocking only in a cover front end region.

4. The interdental cleaner as claimed in claim 1, wherein a region of the cover lying between the fingers is free of the flocking.

5. The interdental cleaner as claimed in claim 1, wherein the flocking is arranged in a region of the cover lying between the fingers.

6. The interdental cleaner as claimed in claim 1, wherein the support is made of a dimensionally stable plastic comprised of polypropylene or polyamide.

7. The interdental cleaner as claimed in claim 1, wherein the plastic material of the support is fiber-reinforced.

8. The interdental cleaner as claimed in claim 1, wherein the cover is predominantly comprised of a thermoplastic elastomer, of a thermoplastic polyurethane or of silicone.

9. The interdental cleaner as claimed in claim 1, wherein the flocking comprises an adhesive layer on which the flock fibers are held.

10. The interdental cleaner as claimed in claim 1, wherein the flock fibers are made of polyamide, polypropylene, polybutylene terephthalate, viscose, acryl, or polyester.

11. The interdental cleaner as claimed in claim 1, wherein a length of the flock fibers lies in a range of 0.2 mm to 2.0 mm.

12. The interdental cleaner as claimed in claim 1, wherein the flock fibers have a fineness in a range of 0.09 tex to 2.2 tex, wherein 1 tex=1 g per 1000 m length.

13. The interdental cleaner as claimed in claim 1, wherein the support has a circular, polygonal, oval or triangular cross section.

14. The interdental cleaner as claimed in claim 1, wherein an outer contour of the cover follows an outer contour of the support.

15. The interdental cleaner as claimed in claim 1, wherein the cover has a triangular outer contour and the support has a circular, polygonal or oval cross section, such that tapering corner regions of the cover are formed.

16. The interdental cleaner as claimed in claim 1, wherein each and every portion of the flocking is located at a spaced location from the support.

17. An interdental cleaner comprising:
a rod-shaped support comprised of plastic with a rear end region having a grip part and an opposite front end region;
a sleeve cover; and
a flocking with flock fibers made of plastic, wherein the rod-shaped support is provided, in the front end region, with the sleeve cover made of a flexible plastic, and the flocking is arranged on the cover, the flocking being located at a spaced location from the rod-shaped support, wherein the outside of the cover has a plurality of integrally formed fingers protruding radially outward, the fingers being made of the same flexible material as the cover, wherein the cover is provided with the flocking in a cover region between a cover front end and the fingers.

18. The interdental cleaner as claimed in claim 17, wherein each of the plurality of integrally formed fingers extend to a radial position beyond a radial position of each of the flock fibers with respect to a longitudinal axis of the sleeve cover.

19. An interdental cleaner comprising:
a rod-shaped support comprised of plastic with a rear end region having a grip part and an opposite front end region;
a sleeve cover; and
a flocking with flock fibers made of plastic, wherein the rod-shaped support is provided, in the front end region, with the sleeve cover made of a flexible plastic, and the flocking is arranged on the cover, each and every portion of the flock fibers being arranged at a position outside of the sleeve cover, wherein the outside of the cover has a plurality of integrally formed fingers protruding radially outward, the fingers being made of the same flexible material as the cover, wherein the cover is provided with the flocking in a cover region between a cover front end and the fingers.

20. The interdental cleaner as claimed in claim 19, wherein each portion of each of the flock fibers is free of contact with the rod-shaped support.

\* \* \* \* \*